United States Patent
Kageyama et al.

(10) Patent No.: US 8,108,134 B2
(45) Date of Patent: Jan. 31, 2012

(54) ON-BOARD APPARATUS AND METHOD USED BY SAID APPARATUS

(75) Inventors: Shioya Kageyama, Toyota (JP); Tomoyasu Tamaoki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 273 days.

(21) Appl. No.: 12/620,717

(22) Filed: Nov. 18, 2009

(65) Prior Publication Data

US 2010/0138115 A1     Jun. 3, 2010

(30) Foreign Application Priority Data

Nov. 28, 2008   (JP) .................................. 2008-303888

(51) Int. Cl.
 *G06F 7/00* (2006.01)
(52) U.S. Cl. ............. 701/117; 701/46; 701/36; 382/104
(58) Field of Classification Search .................... 701/36, 701/10, 46, 117; 340/908.1, 919, 933; 382/103, 382/104

See application file for complete search history.

(56) References Cited

U.S. PATENT DOCUMENTS 6,813,370 B1 * 11/2004 Arai ............................... 382/104
6,978,037 B1 * 12/2005 Fechner et al. ............... 382/103

FOREIGN PATENT DOCUMENTS

| JP | 10-103966 | 4/1998 |
| JP | 2001-206237 | 7/2001 |
| JP | 2002-109694 | 4/2002 |
| JP | 2006-69344 | 3/2006 |
| JP | 2007-26289 | 2/2007 |
| JP | 2008-123348 | 5/2008 |
| JP | 2010-500678 | 1/2010 |
| WO | WO 2008/113637 A1 | 9/2008 |

OTHER PUBLICATIONS

Office Action issued on Dec. 1, 2010, in Japanese Patent Application No. 2008-303888 (with Partial English Translation).

* cited by examiner

*Primary Examiner* — Richard M. Camby
(74) *Attorney, Agent, or Firm* — Oblon, Spivak, McClelland, Maier & Neustadt, L.L.P.

(57) ABSTRACT

A lane marker recognition apparatus which recognizes a lane marker based on a captured image of a road surface in the direction in which a vehicle is traveling includes a lane identifying portion that identifies the type of lane that the vehicle is traveling in based on the image, and a timing changing portion which outputs a change command to change the start timing of an operation of an assist system provided in the vehicle to the assist system when the type of lane identified by the lane identifying portion is a predetermined type of lane.

16 Claims, 7 Drawing Sheets

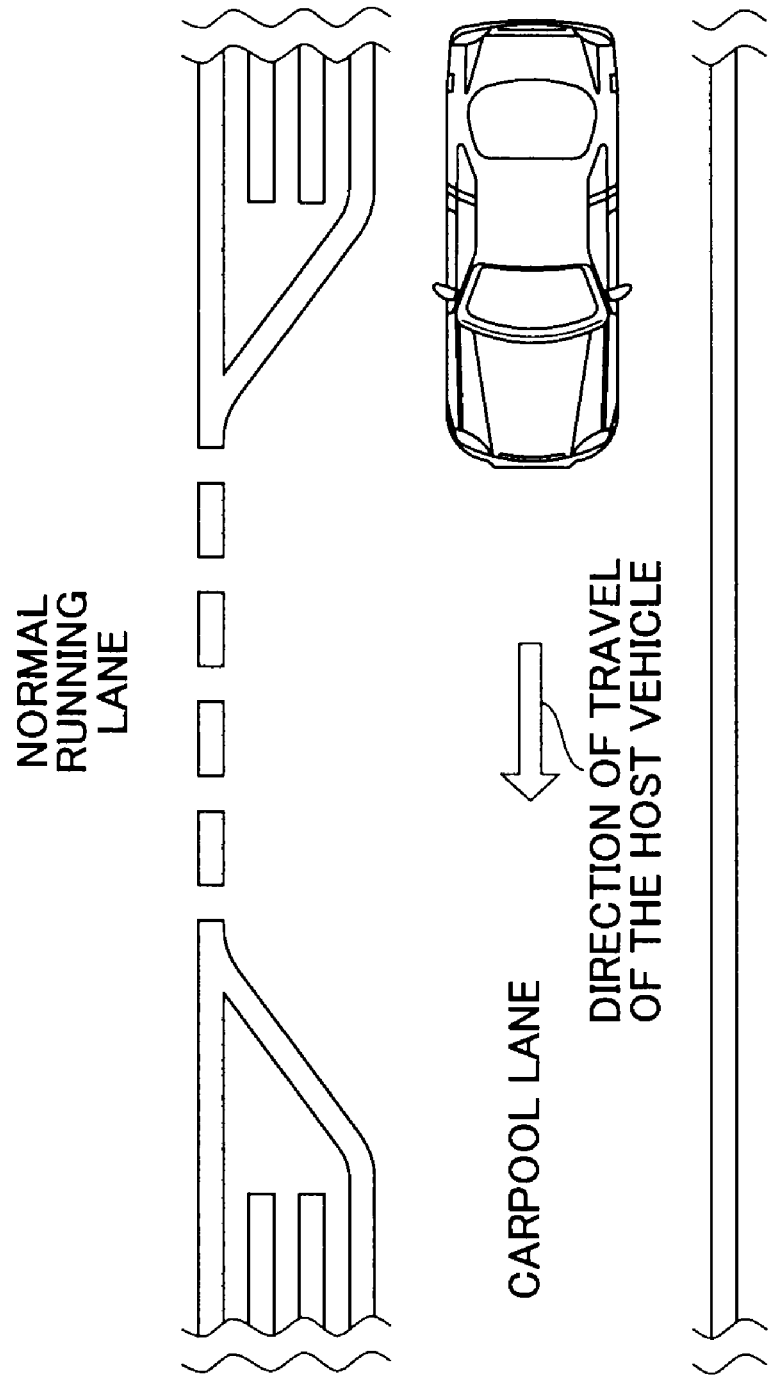

ON-BOARD APPARATUS AND METHOD USED BY SAID APPARATUS

INCORPORATION BY REFERENCE

The disclosure of Japanese Patent Application No. 2008-303888 filed on Nov. 28, 2008 including the specification, drawings and abstract is incorporated herein by reference in its entirety.

BACKGROUND OF THE INVENTION

1. Field of the Invention

The invention relates to a lane marker recognition apparatus and a lane marker recognition method executed by that apparatus. More particularly, the invention relates to a lane marker recognition apparatus provided in a movable object such as a vehicle, and a lane marker recognition method executed by that apparatus.

2. Description of the Related Art

Vehicles are known which are provided with any of a variety of assist systems such as a lane departure warning system which determines that there is a danger of lane departure while traveling when the distance to a lane marker of the lane in which the vehicle is traveling becomes equal to or less than a predetermined threshold value, and notifies the driver of that danger, and a preventive safety system that automatically takes up the slack in a seatbelt and automatically activates a brake when a numerical value based on the relative position and relative speed between the vehicle and an object (such as another vehicle or a pedestrian or the like) detected by laser becomes equal to or less than a predetermined threshold value. One example of such an assist system is the lane departure prevention system described in Japanese Patent Application Publication No. 2001-206237 (JP-A-2001-206237).

The system described in JP-A-2001-206237 performs a lane change determining process in which it determines whether the steering torque and/or the lateral offset from the center in the width direction of the lane has exceeded a respective predetermined threshold value, and determines that the vehicle will change lanes if the threshold value has been exceeded. If it is determined that the vehicle will not change lanes, lane keeping control is performed by generating a normal amount of steering torque so that the vehicle travels in the center of the lane. Meanwhile, with the system described in JP-A-2001-206237, when it is determined that the vehicle will cross a lane marker of the lane and change lanes, a change type determining process starts to be performed in which the system determines whether the change is a road change in which the lane marker that the vehicle is attempting to cross is a solid line, or a lane change in which the lane marker that the vehicle is attempting to cross is a broken line, based on the results from a processed image of the road surface in the direction in which the vehicle is traveling.

Here, a solid lane marker is used for separating a road from a sidewalk by a solid white line, for example, and a broken lane marker is used for separating the lanes on a two or three lane road by a white broken line, for example. Therefore, when the vehicle is attempting to cross a solid lane marker, it can be assumed that the vehicle is veering off of the road onto the sidewalk. On the other hand, when the vehicle is attempting to cross a broken lane marker, it can be assumed that the vehicle is making a normal lane change in which the vehicle is changing from one lane to an adjacent lane. Incidentally, a road change may be considered to be a highly significant lane change for the driver.

Therefore, with the system described in JP-A-2001-206237, when the change type determining process starts and it is determined that the vehicle is attempting to cross a solid lane marker, it is determined that the vehicle is making a highly significant road change in which it is necessary to warn the driver, and the system performs a lane departure preventing operation in which it prevents the vehicle from veering off of the road by generating more steering torque than normal to make the vehicle travel in the center of the lane, i.e., by generating more steering torque than normal in the opposite direction of the steering torque generated by the driver which corresponds to the road changing direction. Accordingly, with the system described in JP-A-2001-206237, when the vehicle is making a highly significant road change, a lane departure preventing operation is performed which generates torque in the direction opposite the direction of the steering torque generated by the driver, which both prevents the vehicle from veering off of the road and makes the driver aware of the fact that the vehicle is making a highly significant road change.

However, the system described in JP-A-2001-206237 has the following problems. That is, as described above, when the steering torque and/or the lateral offset from the center of the lane exceeds the respective predetermined threshold value, it is determined that the vehicle is changing lanes so the change type determining process starts.

However, if the driver turns the steering wheel at the same speed (i.e., rotation speed) by applying the same amount of steering torque, for example, the direction in which the host vehicle travels will change more when the host vehicle is traveling at a relatively high speed than when the host vehicle is traveling at a relatively low speed. Therefore, the following problem arises when the change type determining process starts after the steering torque and/or the offset of the vehicle from the center of the lane exceeds the respective predetermined threshold value, as is the case with the system described in JP-A-2001-206237. For example, if it has been determined that the host vehicle is making a road change and the host vehicle is traveling faster than a predetermined speed, the host vehicle may veer out of the lane between the time that the lane departure preventing operation starts and the time that the driver actually becomes aware of the road change.

An example of when the host vehicle is traveling faster than a predetermined speed may be when the host vehicle is traveling in a passing lane next to a running lane. That is, with an assist system that starts operating based on a predetermined threshold value, as the system described in JP-A-2001-206237 does, the start timing of the operation may be late, such that the intended aim of the system is not able to be achieved. Therefore, the start timing of the operation of the assist system needs to be changed according to the type of lane that the host vehicle is traveling in.

SUMMARY OF THE INVENTION

The invention proposes an on-board apparatus, and a method executed by that apparatus, capable of changing the start timing of an operation according to the lane that a host vehicle is traveling in.

A first aspect of the invention relates to a lane marker recognition apparatus which recognizes a lane marker based on a captured image of a road surface in the direction in which a vehicle is traveling. This lane marker recognition apparatus includes a lane identifying portion that identifies the type of lane that the vehicle is traveling in based on the image, and a timing changing portion which outputs a change command to change the start timing of an operation of an assist system provided in the vehicle to the assist system when the type of lane identified by the lane identifying portion is a predetermined type of lane.

The apparatus according to the first aspect of the invention changes the start timing of an operation of the assist system when the type of lane identified based on the captured image of the road surface in the direction in which the vehicle is traveling is a predetermined type of lane. As a result, it is possible to increase safety more than when traveling in another lane.

The timing changing portion may output the change signal when the type of lane identified by the lane identifying portion is a carpool lane.

Therefore, with this apparatus it is possible to change the start timing of an operation of the assist system when the host vehicle is traveling in a carpool lane.

The lane identifying portion may include i) a lane marker counting portion which counts the number of lane markers captured in a predetermined left region in the image and the number of lane markers captured in a predetermined right region in the image, based on the image, and ii) a carpool identifying portion that identifies the type of lane as the carpool lane when the number of lane markers captured in the right region counted by the lane marker counting portion is equal to or greater than the number of lane markers captured in the left region.

Therefore, with this apparatus it is possible to determine that the type of lane that the host vehicle is traveling in is a carpool lane when the number of right lane markers on the road that the vehicle is traveling on, which is determined based on the image of the road surface in the direction in which the host vehicle is traveling, is equal to or greater than the number of left lane markers.

The lane marker counting portion may count the number of lane markers captured in a predetermined region as a far region in which an area far from the host vehicle in the direction in which the host vehicle is traveling is captured, and a near region in which an area near the host vehicle in the direction in which the host vehicle is traveling is captured, in both the left region and the right region; and the carpool lane identifying portion may identify the type of lane as the carpool lane when the number of lane markers captured in the right region is equal to or greater than the number of lane markers captured in the left region in at least one of the near region or the far region.

Therefore, with this apparatus it is possible to determine whether the number of right lane markers on the road on which the host vehicle is traveling is equal to or greater than the number of left lane markers based on one of the far image or the near image in the captured image of the road surface in the direction in which the host vehicle is traveling.

The carpool lane identifying portion may identify the type of lane as the carpool lane when i) the number of lane markers in both the near region and the far region in both the left region and the right region is determined to be one or more by the lane marker counting portion, ii) the number of lane markers in the near region of the right region is equal to or greater than the number of lane markers in the near region of the left region, and iii) the number of lane markers in the far region of the right region is equal to or greater than the number of lane markers in the near region of the left region.

Therefore, with this apparatus it is possible to identify the type of lane that the host vehicle is traveling in as the carpool lane when i) one or more lane markers are identified in each of an image considered to capture the left lane marker near the host vehicle, an image considered to capture the left lane marker far from the host vehicle, an image considered to capture the right lane marker near the host vehicle, and an image considered to capture the right lane marker far from the host vehicle, in the captured image of the road surface in the direction in which the host vehicle is traveling, ii) the number of near right lane markers is equal to or greater than the number of near left lane markers, and iii) the number of far right lane markers is equal to or greater than the number of near left lane markers. As a result, it is possible to accurately determine a carpool lane.

The carpool lane identifying portion may identify the type of lane as the carpool lane when i) the number of lane markers in the near region of both the left region and the right region is determined to be one or more by the lane marker counting portion, and ii) the difference of the number of lane markers in the near region of the right region minus the number of lane markers in the near region of the left region is two or more.

Therefore, with this apparatus it is possible to identify the type of lane that the host vehicle is traveling in as a carpool lane based on only the image that captures the near lane marker in the captured image of the road surface in the direction in which the host vehicle is traveling.

The carpool lane identifying portion may identify the type of lane as the carpool lane when i) the number of lane markers in the far region of both the left region and the right region is determined to be one or more by the lane marker counting portion, and ii) the difference of the number of lane markers in the far region of the right region minus the number of lane markers in the near region of the left region is two or more.

Therefore, with this apparatus it is possible to identify the type of lane that the host vehicle is traveling in as a carpool lane based only on the image that captures the far lane marker, in the captured image of the direction in which the host vehicle is traveling.

The timing changing portion may output a change command to a preventive safety device provided in the vehicle as the assist system.

Therefore, according to this apparatus it is possible to change the start timing of an operation of the preventative safety device provided in the host vehicle.

The timing changing portion may output the change command to a lane departure warning device provided in the vehicle as the assist system.

Therefore, with this apparatus it is possible to change the alarm timing by changing the timing of an operation of the lane departure warning device provided in the host vehicle.

The timing changing portion may output the change command to advance the start timing to the assist system.

Therefore, with this apparatus it is possible to further increase the safety of an occupant by advancing the start timing of an operation of the assist system provided in the host vehicle.

A second aspect of the invention relates to a preventive safety device. This preventive safety device includes a command receiving portion, a detecting portion, a calculating portion, an operating portion, and a resetting portion. The command receiving portion recognizes a lane marker based on an image that captures a road surface in the direction in which a vehicle is traveling, identifies the type of lane that the vehicle is traveling in based on the image, and receives a change command to change a start timing of an operation when the type of lane identified is a predetermined type of lane. The detecting portion detects an object. The calculating portion calculates the time to collision between the vehicle and the object based on the relative distance and relative speed between the vehicle and the object detected by the detecting portion. The operating portion starts an operation to increase safety when the time calculated by the calculating portion is equal to or less than a predetermined threshold value. The resetting portion resets the threshold value to a larger value when the command receiving portion receives the change command.

Resetting the threshold value for the time to collision with an object to a larger value when a change command, which is output when it is determined that the type of lane that the host vehicle is traveling in is a predetermined type of lane, is received in this way enables an operation to increase safety to be started at an earlier timing when the host vehicle is traveling in the predetermined type of lane, thereby increasing safety.

The operating portion may start an operation to issue a warning to a driver of the vehicle when the time calculated by the calculating portion is equal to or less than the threshold value that has been reset by the resetting portion.

Issuing a warning when the time to collision with the obstacle is equal to or less than the threshold value that has been reset to a larger value when the host vehicle is traveling in the predetermined type of lane in this way enables the driver to be notified of the possibility of collision with the obstacle at an earlier timing, so safety can be increased.

The operating portion may start to operate a brake of the vehicle when the time calculated by the calculating portion is equal to or less than the threshold value that has been reset by the resetting portion.

Operating the brake when the time to collision with the object is equal to or less than the threshold value that has been reset to a larger value when the host vehicle is traveling in a predetermined type of lane in this way enables the brake to be operated at an earlier timing before the host vehicle and the object collide, so safety can be increased.

The operating portion may start an operation to retract a seatbelt worn by an occupant of the vehicle when the time calculated by the calculating portion is equal to or less than the threshold value that has been reset by the resetting portion.

Starting an operation to retract a seatbelt when the time to collision with an object is equal to or less than the threshold value that has been reset to a larger value when the host vehicle is traveling in a predetermined type of lane in this way enables the seatbelt to be retracted at an earlier timing before the host vehicle and the obstacle collide, so safety can be increased.

A third aspect of the invention relates to a lane departure warning device. This lane departure warning device includes a command receiving portion, an information obtaining portion, a first calculating portion, a second calculating portion, a third calculating portion, an operating portion, and a resetting portion. The command receiving portion recognizes a lane marker based on an image that captures a road surface in the direction in which a vehicle is traveling, identifies the type of lane that the vehicle is traveling in based on the image, and receives a change command to change a start timing of an operation which is generated when the type of lane identified is a predetermined type of lane. The information obtaining portion obtains road information indicative of the lane width of the lane that the vehicle is traveling in, which is detected based on the image, and the offset from the center of the lane to the center in the width direction of the vehicle, which is detected based on the image. The first calculating portion calculates the width from the center of the lane that the vehicle is traveling in to one of a left or right lane marker based on the lane width indicated by the road information. The second calculating portion calculates the difference of the width calculated by the first calculating portion minus a predetermined threshold value. The third calculating portion calculates the sum of the offset indicated by the road information and the width from the center in the width direction of the vehicle to one of the left or right side of the vehicle. The operating portion starts an operation to issue an alarm to a driver of the vehicle when the sum calculated by the third calculating portion becomes equal to or greater than the difference calculated by the second calculating portion. The resetting portion resets the threshold value to a larger value when the command receiving portion receives the change command.

Calculating the width from the center of the lane that the host vehicle is traveling in to the alarm line, using the second calculating portion, so that it is smaller by a threshold value that has been reset to a larger value by the resetting portion when a change command, which is generated when it is determined that the type of lane that the host vehicle is traveling in is a predetermined type of lane, is received in this way enables the driver to be notified at an even earlier timing that the host vehicle may veer out of its lane, so safety can be increased.

A fourth aspect of the invention relates to a lane marker recognition method executed by a lane marker recognition apparatus which recognizes a lane marker based on a captured image of a road surface in the direction in which a vehicle is traveling. This lane marker recognition method includes identifying the type of lane that the vehicle is traveling in based on the image, and outputting a change command to change the start timing of an assist system provided in the vehicle based on the type of lane identified.

Also, the lane marker recognition method of the invention makes it possible to obtain the same effects as those obtained by the lane marker recognition apparatus according to the invention described above.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 8 is a view of an example of lane change point of a passing lane.

DETAILED DESCRIPTION OF EMBODIMENTS

Figure 1:
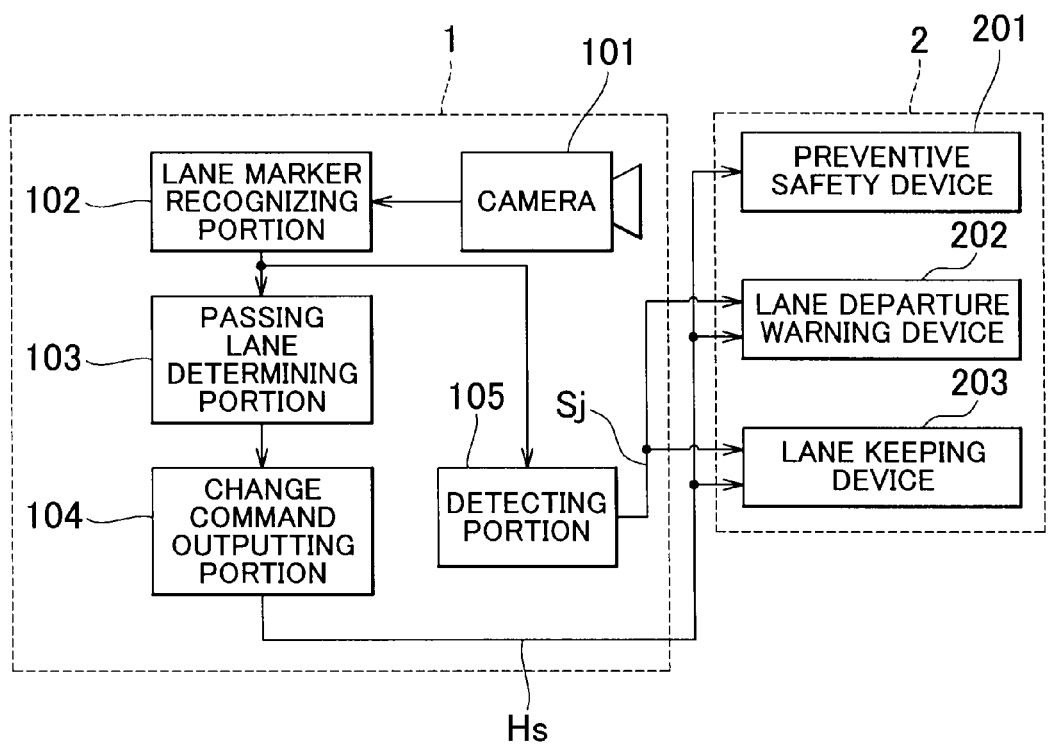
FIG. 1 is a block diagram schematically showing a lane marker recognition apparatus according to a first aspect of the invention.

FIG. 1 is a block diagram schematically showing a lane marker recognition apparatus 1 according to a first aspect of the invention. The lane marker recognition apparatus 1 includes a camera 101, a lane marker recognizing portion 102, a passing lane determining portion 103, a change command outputting portion 104, and a detecting portion 105.

Figure 2A:
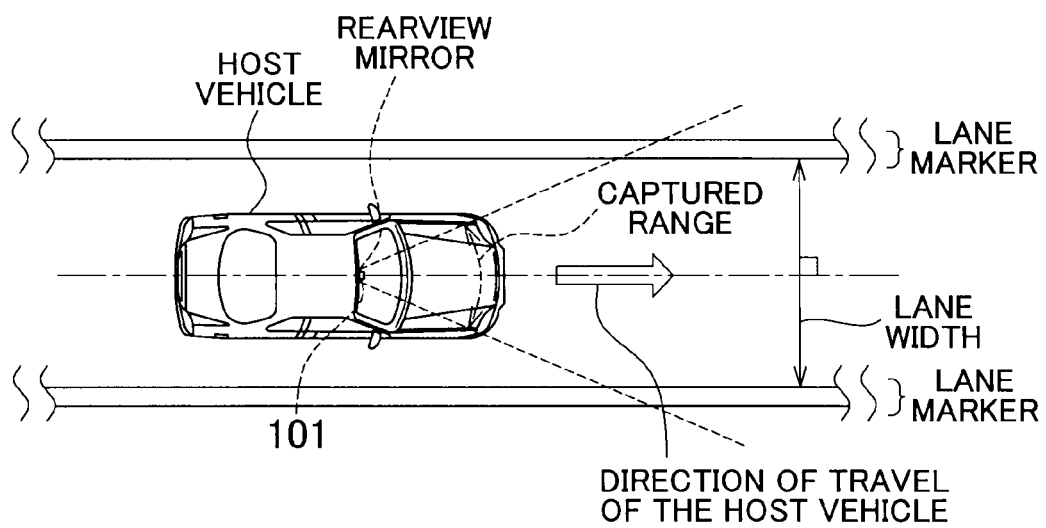
FIGS. 2A and 2B are views of an example mounting position of a camera.
Figure 2B:
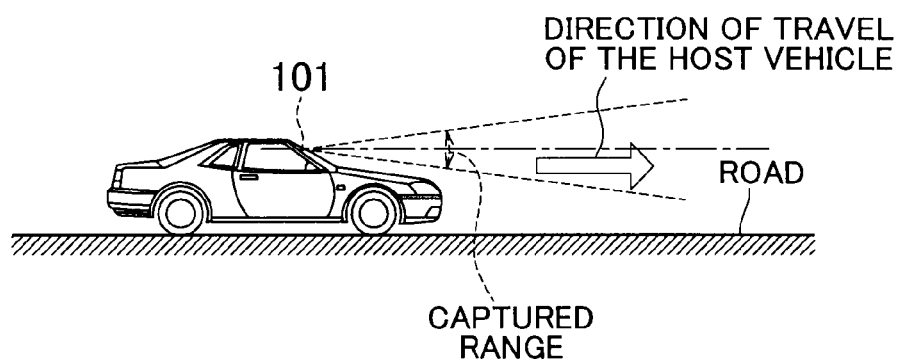

The camera 101 is typically a CCD (Charge Coupled Device) camera or a CMOS (Complementary Metal Oxide Semiconductor) camera or the like. FIGS. 2A and 2B both show an example mounting position of the camera 101 in a host vehicle. FIG. 2A is a view from directly above the host vehicle while running, and FIG. 2B is a view from the right side of the host vehicle shown in FIG. 2A. In the example shown in FIGS. 2A and 2B, the camera 101 is mounted on the rearview mirror of the host vehicle so as to be able to capture an image of the road surface in the direction of travel of the host vehicle. The camera 101 captures successive images (such as one frame per ¹⁄₂₄ seconds) in the direction in which the host vehicle is traveling, as shown in FIGS. 2A and 2B, and generates image data indicative of the captured image every time an image is captured. The imaging range of the camera 101 includes at least left and right lane markers on the road traveled by the host vehicle, as shown in FIG. 2A.

Incidentally, the mounting position of the camera 101 shown in FIGS. 2A and 2B is only an example. The camera 101 may be mounted anywhere on the host vehicle as long as at least the left and right lane markers are in the image captured by the camera 101 and the lane markers can be recognized by the lane marker recognizing portion 102 which will be described later.

The lane marker recognizing portion 102 obtains the generated image data when it is generated by the camera 101. The lane marker recognizing portion 102 then recognizes the lane markers captured in the image indicated by the obtained image data by image processing the obtained image data. At this time, the lane markers recognized by the lane marker recognizing portion 102 are the left and right lane marker on the road on which the host vehicle is traveling.

Figure 3:
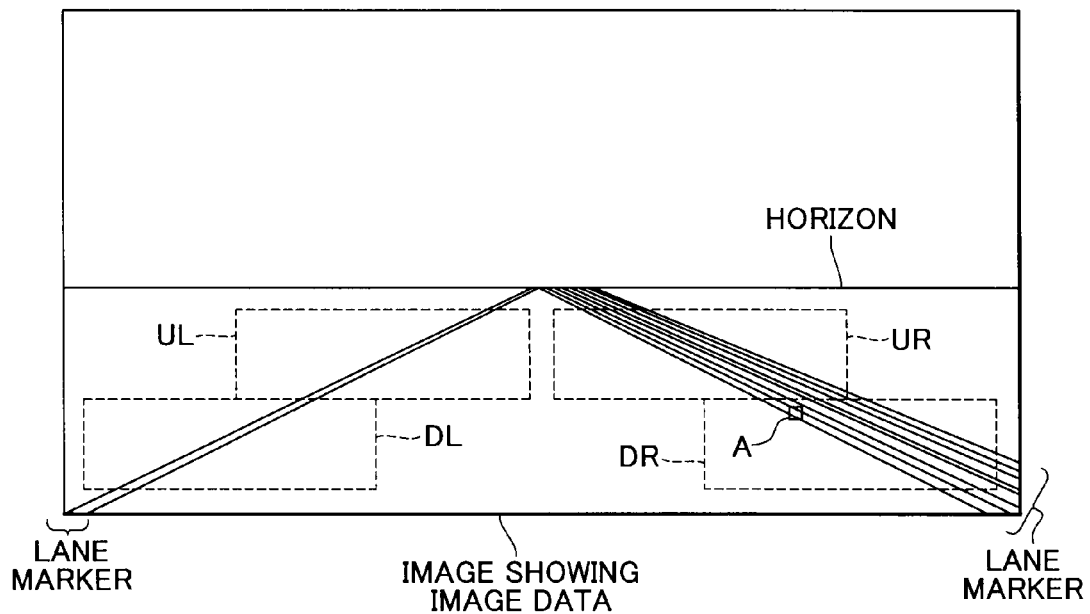
FIG. 3 is a view of an image captured by the camera.

The method of the image processing when the lane marker recognizing portion 102 recognizes the left and right lane markers according to this example embodiment will now be described with reference to FIG. 3. FIG. 3 is a view of an example image indicated by image data generated by the camera 101 at a point when the host vehicle is traveling on the road. The lane of the road captured in the image shown in FIG. 3 is an example of a passing lane so there are a plurality of lane markers on the right side. The passing lane recognized by the invention will be described in detail later.

When the image data is obtained, the lane marker recognizing portion 102 performs a well-known edge detection process on the obtained image data. The lane marker recognizing portion 102 then generates edge image data that indicates an edge image in which the edge in the image indicated by the obtained image data has been extracted by performing the edge detection process. The edge image indicated by the edge image data generated by the lane marker recognizing portion 102 is an image in which the amount of change in the luminance of the pixels that make up the image indicated by the obtained image data has been converted to luminance height, for example.

An example of the edge detection process performed when the lane marker recognizing portion 102 generates an edge image will now be described in detail with reference to FIG. 4. Incidentally, the edge detection process described below is only an example. Any other well-known edge detection process may also be used as long as edge image data that can recognize a lane marker, as will be described later, can be generated.

Figure 4:
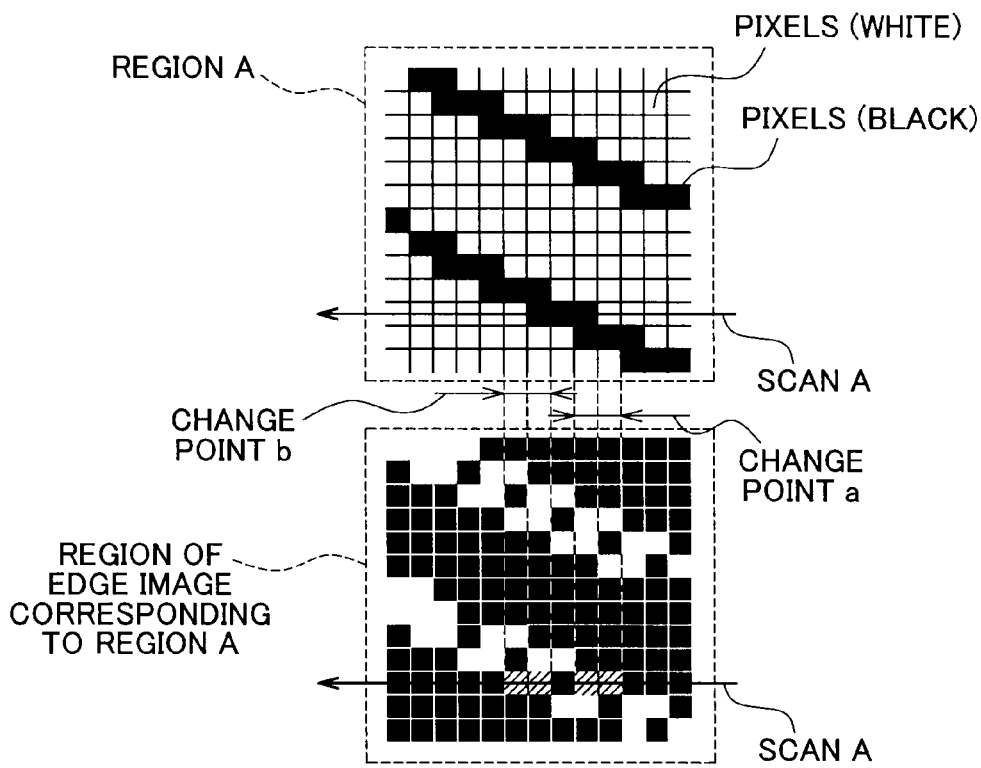
FIG. 4 is a view of an example of a process for detecting an edge.

FIG. 4 is a view of the pixels in region A shown in FIG. 3 and the pixels in the region of the edge image corresponding to region A. Region A shown in FIG. 4 includes pixels that indicate a pair of edges of one lane marker. Incidentally, to simplify the description, FIG. 4 shows images made up of white pixels having the highest luminance able be indicated by the image data generated by the camera 101, and black pixels having the lowest luminance able to be indicated by the image data. However, the luminance of the pixels that make up the edge image is not limited to the highest and lowest luminance able to be indicated by the image data. Alternatively, the luminance may be in between the highest and lowest, according to the amount of change in the luminance described above.

When performing the edge detection process, the lane marker recognizing portion 102 scans a horizontal row of pixels that make up the images indicated by the obtained image data in order, one pixel at a time, from the lower edge to the upper edge. As an example of scanning one horizontal row of pixels, during the scan indicated as scan A in FIG. 4, an edge detection process is performed which converts pixels having a luminance that changes relative to the luminance of adjacent pixels into pixels having a luminance according to the amount of that change, as shown as change points "a" and "b" in FIG. 4, for example. Here, change point "a" is an example of a change point where the pixels change from white pixels to black pixels when scanning the image from right to left as shown with scan A in FIG. 4. Change point "b" is an example of a change point where the pixels change from black pixels to white pixels when scanning the image from right to left as shown with scan A in FIG. 4. In the example shown in FIG. 4, the lane marker recognizing portion 102 converts the pixels at change points "a" and "b" in the image indicated by the image data to white pixels in an edge image, as shown by the slanted line, i.e., converts those pixels to high luminance pixels, by performing scan A. The lane marker recognizing portion 102 generates edge image data indicative of the edge image by scanning all of the pixels that make up the image from the lower edge to the upper edge of the image indicated by the obtained image data.

Next, an edge recognition process performed by the lane marker recognizing portion 102 will be described. Incidentally, the edge recognition process described below is only an example. Any well-known edge recognition process may be used as long as it is able to recognize the edge of a given lane marker, as will be described later.

Once the edge image data is generated, the lane marker recognizing portion 102 performs the edge recognition process in which it recognizes the edges of a lane marker by scanning predetermined regions of the edge image indicated by the generated edge image data. In this example, there are four predetermined regions when the lane marker recognizing portion 102 performs the edge recognition process, i.e., a far right region UR, a near right region DR, a far left region UL, and a near left region UR. The far right region UR is a region of the edge image that is considered to capture a lane marker on the right side in the distance in the direction in which the host vehicle is traveling. The near right region DR is a region of the edge image that is considered to capture a lane marker on the right side close to the host vehicle in the direction in which the host vehicle is traveling. The far left region UL is a region of the edge image that is considered to capture a lane marker on the left side in the distance in the direction in which the host vehicle is traveling. The near left region DL is a region of the edge image that is considered to capture a lane marker on the left side close to the host vehicle in the direction in which the host vehicle is traveling.

Incidentally, to simplify the description, FIG. 3 shows the four regions on the edge image correlated with their respective positions on the image indicated by the image data that the lane marker recognizing portion 102 obtained from the camera 101. Also, the position, shape, and size of the four regions in the edge image are not particularly limited as long as they are able to capture the lane markers.

Figure 5:
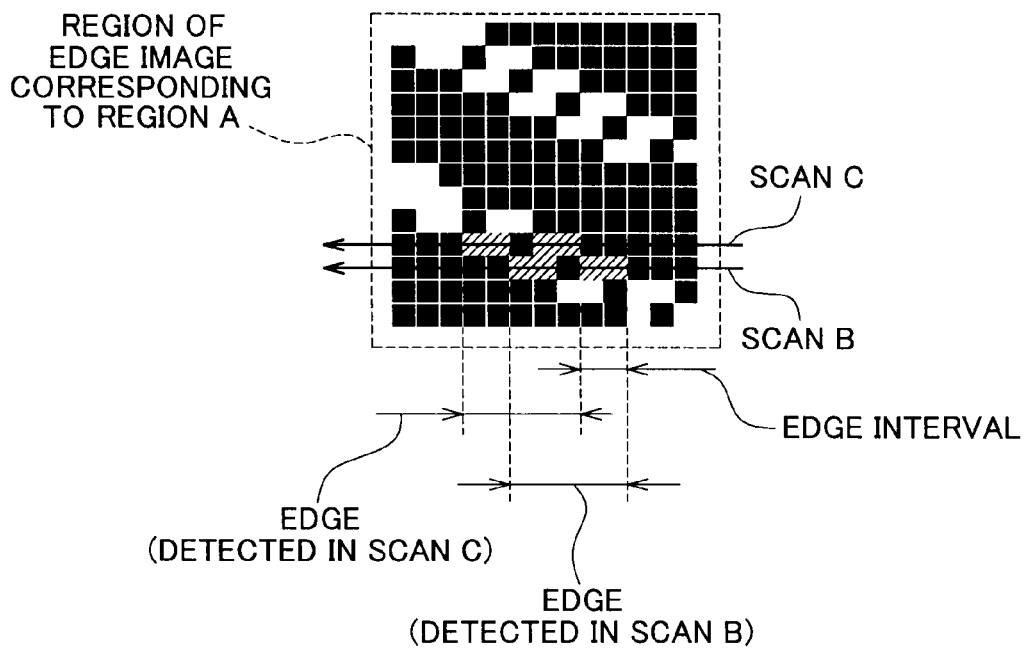
FIG. 5 is a view of an example of a process for recognizing an edge of a lane marker.

When scanning the four regions of the edge image, the lane marker recognizing portion 102 scans in order, one pixel at a time, the horizontal rows of the pixels in each of the four regions, i.e., the far right region UR, the near right region DR, the far left region UL, and the near left region DL in the edge image, from the lower edge to the upper edge of the edge image. FIG. 5 is a view of an example of the pixels in the region of the edge image which corresponds to region A in FIG. 3, in the edge image processed by the edge detection process, with respect to the image indicated by the image data obtained by the lane marker recognizing portion 102 from the camera 101. The method by which the lane marker recognizing portion 102 scans the edge image and recognizes an edge of a lane marker will now be described with reference to FIG. 5.

When the lane marker recognizing portion 102 scans one horizontal row of pixels in scan B in FIG. 5, for example, the lane marker recognizing portion 102 detects, as a row of pixels indicating an edge of a lane marker, a horizontal row of pixels where the number of pixels after the pixel luminance has changed from a relatively low luminance to a relatively high luminance until the pixel luminance changes from the relatively high luminance back to a relatively low luminance is a predetermined number (such as five pixels in the example shown in FIG. 5). Also, the lane marker recognizing portion 102 recognizes an edge in which the edge interval in the horizontal direction of the edge detected in the scan B in FIG. 5 and the edge detected in scan C in FIG. 5 is within a predetermined range as the same edge of a single lane marker.

More specifically, when scanning a region on the right side of the image indicated by the image data obtained from the camera 101 (i.e., the far right region UR and the near right region DR in the example shown in FIG. 3), such as the near right region DR that includes region A, for example, from among the four regions shown in FIG. 3, the lane marker recognizing portion 102 recognizes, as an edge of the same lane marker, an edge in which the edge detected in the next scan, scan C, is within a predetermined edge interval to the left in the image (an interval of two pixels to the left in the example shown in FIG. 5) with respect to the edge detected in scan B, in the region of the edge image that corresponds to region A shown as the example in FIG. 5. Therefore, the lane marker recognizing portion 102 recognizes the edges shown by the slanted lines in FIG. 5 detected by scanning region A, which is in the near right region DR, in scans B and C, as edges of the same lane marker.

Incidentally, in the example described above with reference to FIG. 5, the lane marker recognizing portion 102 recognizes an edge by scanning a region on the right side of the image indicated by the image data obtained from the camera 101, such as the near right region DR that includes region A, from among the four regions described above. Meanwhile, when the lane marker recognizing portion 102 recognizes an edge by scanning a region on the left side of the image indicated by the image data obtained from the camera 101 (i.e., the far left region UL and the near left region DL in the example shown in FIG. 3), from among the four regions described above, the lane marker recognizing portion 102 recognizes, as the same edge of a single lane marker, an edge in which the edge detected by scanning the next horizontal row of pixels is within a predetermined edge interval to the right in the image with respect to the edge detected by scanning the last horizontal row of pixels, which is the opposite from when recognizing an edge by scanning a region on the right side. Incidentally, the edge interval described above may be an interval of the same number of pixels or an interval of a different number of pixels when scanning a region to the right in the image as when scanning a region to the left in the image. Moreover, the edge interval may be an interval of the same number of pixels or an interval of a different number of pixels between a near region (e.g., the near right region DR and the near left region DL in the example shown in FIG. 3) and a far region (e.g., the far right region UR and the far left region UL in the example shown in FIG. 3).

Next, the lane marker recognition process of the lane marker recognizing portion 102 will be described. When the edge recognition process described above ends, the lane marker recognizing portion 102 performs a lane marker recognition process in which it generates both lane marker information indicative of the position in the image of the lane marker in all four regions, and lane marker number information indicative of the number of lane markers. When performing the lane marker recognition process, the lane marker recognizing portion 102 scans each of the four regions from the center toward the outside of a given horizontal row of pixels in the edge image. Every time two edges are detected, the lane marker recognizing portion 102 counts them as one lane marker. At this time, the lane marker recognizing portion 102 may also scan a plurality of horizontal rows of pixels and use the average value of the number of counted lane markers as the number of lane markers in each region. When each region has finished being scanned and the lane markers are counted, the lane marker recognizing portion 102 generates both lane marker number information indicative of the number of lane markers counted in each region, and lane marker information indicative of the position in the image of the pixels of the lane marker recognized in each region. One example of the position in the image of the pixels of the lane marker indicated by the lane marker information is a position based on a predetermined point of origin (such as the point of origin of a coordinate system when the position of the pixels of the edge image are indicated by an X-Y coordinate system) in the edge image indicated by the edge image data.

Figure 6:
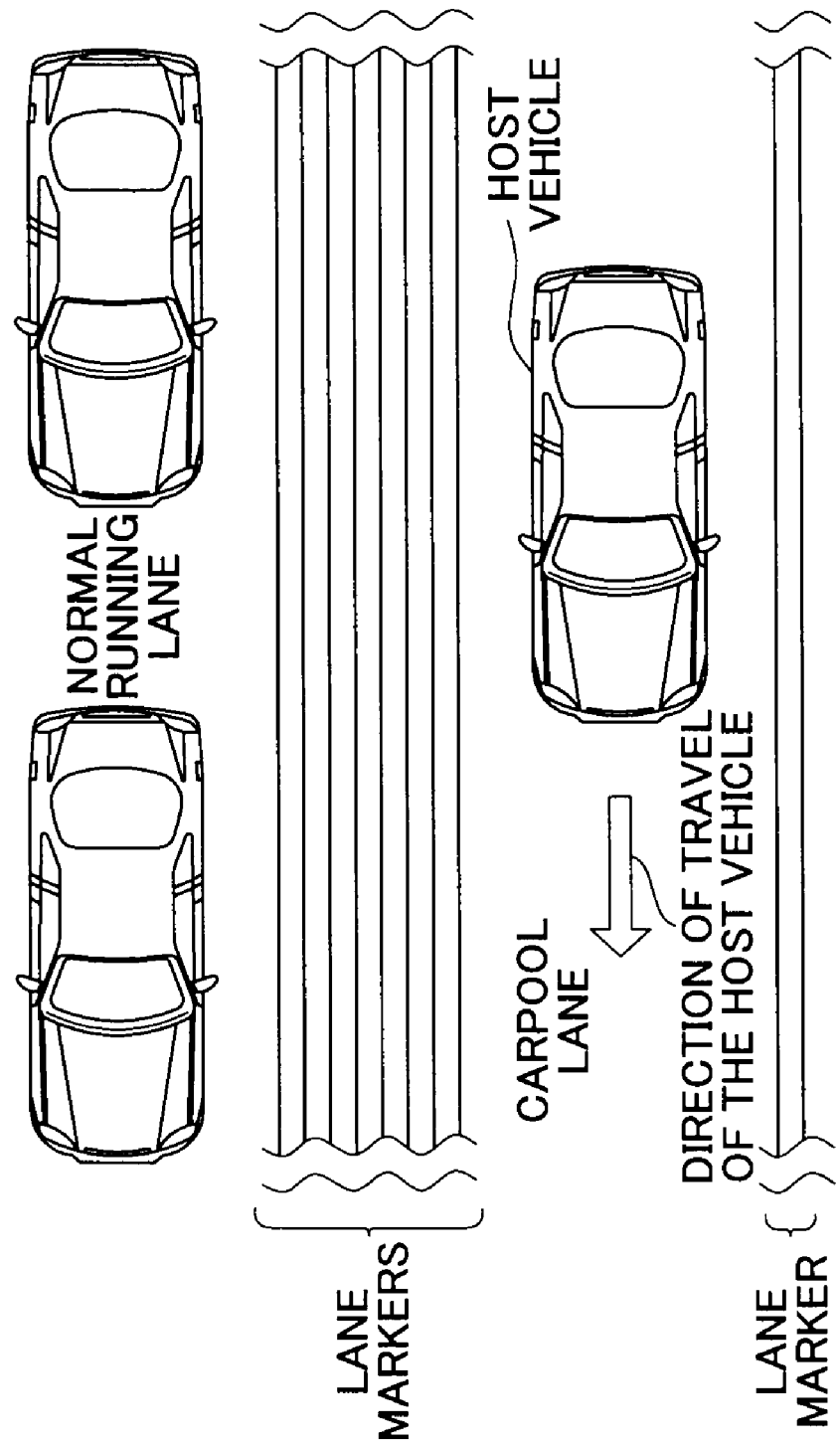
FIG. 6 is a view of an example of a passing lane.

When the lane marker number information is generated by the lane marker recognizing portion 102, the passing lane determining portion 103 obtains that generated lane marker number information. Once the lane marker number information is obtained, the passing lane determining portion 103 determines whether the type of lane on the road that the host vehicle is traveling on is a passing lane based on the obtained lane marker number information. A carpool lane, which is well known in the United States, for example, is one example of the passing lane determined in this example embodiment. A carpool lane is typically a lane provided on the left in the direction in which a vehicle travels in a normal lane. The carpool lane is separated from normal lanes that are to the right, by multiple lines formed by a plurality of lane markers, as shown in FIG. 6. Therefore, the passing lane determining portion 103 determines whether the type of lane that the host vehicle is traveling in is a carpool lane by comparing the number of left lane markers with the number of right lane markers in the direction in which the host vehicle is traveling, from among the number of lane markers indicated by the lane marker number information described above.

The passing lane determining portion 103 determines that the type of lane in which the host vehicle is traveling is a carpool lane when the following conditions are satisfied: i) the number of lane markers recognized in each of the four regions, from among the number of lane markers indicated by the lane marker number information, is one or more, ii) the difference of the number of lane markers in the near right region DR minus the number of lane markers in the near left region DL is one or more, and iii) the difference of the number of lane markers in the far right region UR minus the number of lane markers in the far left region UL is one or more. If it is determined that the type of lane in which the host vehicle is traveling is a carpool, the passing lane determining portion 103 generates determination information indicating that the type of lane that the host vehicle is traveling in is a carpool lane. If, on the other hand, it is determined that the type of lane in which the host vehicle is traveling is not a carpool, the passing lane determining portion 103 does not generate the determination information.

When the determination information is generated by the passing lane determining portion 103, the change command outputting portion 104 obtains the generated determination information. The change command outputting portion 104 then outputs a change command Hs to change the timing at which operation starts to each device in the assist system 2, which will be described later, over the period of time during which the determination information is obtained.

When the lane marker information is generated by the lane marker recognizing portion 102, the detecting portion 105 obtains the generated lane marker information. Once the lane marker information is obtained, the detecting portion 105 detects the lane width in the width direction of the road on which the host vehicle is traveling, the curvature of the road on which the host vehicle is traveling, the yaw angle with respect to the direction of the road on which the host vehicle is traveling, the offset from the center in the width direction of the road on which the host vehicle is traveling to the center in the width direction of the host vehicle, and the pitch angle of the host vehicle, according to a well-known method that uses the position in the image of the lane marker indicated by the obtained lane marker information. The detecting portion 105 then generates road information Sj indicative of each of the detected lane width, road curvature, yaw angle, offset, and pitch angle. Incidentally, the information indicated by the road information Sj generated by the detecting portion 105 when the host vehicle is traveling in a carpool lane may also be detected based on the innermost lane marker, from among one or more lane markers on the left and right sides.

Next, the assist system 2 will be described. The assist system 2 is connected to the output side of the lane marker recognition apparatus 1, as shown in FIG. 1, for example. One example of this assist system 2 includes a preventive safety device 201, a lane departure warning device 202, and a lane keeping device 203.

The preventive safety device 201 is a device for improving safety when the host vehicle collides with an object, by calculating the time until the host vehicle collides with an object (e.g., TIC (Time To Collision) according to a well-known method (such as a method of multiplying the relative distance by the relative speed) based on the relative distance between the host vehicle and the object (such as another vehicle, a pedestrian, or a guardrail), which is calculated by radar, not shown. When there is an object in which the calculated time is equal to or less than a predetermined threshold value, the preventive safety device 201 determines that there is a possibility of collision with the object and automatically activates, issues an alarm, and automatically takes up the slack in the seatbelt by retracting it.

When determination information Hj has been generated by the change command outputting portion 104, the preventive safety device 201 obtains that generated determination information Hj. Once the determination information Hj has been obtained, the preventive safety device 201 increases the threshold value for the period of time until the host vehicle collides with the object described above. Accordingly, when the determination information Hj is generated, i.e., when it is determined that the host vehicle will collide with an object when traveling in the carpool lane, the preventive safety device 201 is able to make the timing for starting the brake operation, the timing for starting the operation to issue an alarm, and the timing for starting the operation to retract the seatbelt and the like, earlier than it is when the host vehicle is traveling in a normal running lane. It is assumed that when the host vehicle is traveling in the carpool lane, the speed at which the host vehicle is traveling is relatively high compared to the speed at which a vehicle in the adjacent lane to the right is traveling, or the adjacent running lane to the right of the carpool lane that the host vehicle is traveling in is congested. That is, when the host vehicle is traveling in the carpool lane, it is traveling at a speed that is higher than the speed at which a vehicle that is traveling in an adjacent running lane to the right is traveling. Thus, when the host vehicle is traveling in the carpool lane, the preventive safety device 201 increases the threshold value as described above to advance the timing at which the various operations described above start. Accordingly, when the host vehicle is traveling at a speed that is relatively high compared to the speed at which a vehicle that is traveling in a running lane to the right is traveling, it is possible to determine the possibility of a collision with another vehicle that is traveling relatively fast in the carpool lane, for example, at an earlier timing than it is when traveling in a normal running lane, and thus advance the start timing of the brake operation and the start timing of the operation of retracting the seatbelt and the like. As a result, it is possible to increase the safety when the host vehicle is traveling in the carpool lane.

When the road information Sj is generated by the detecting portion 105, the lane departure warning device 202 obtains that generated road information Sj. Once the road information Sj is obtained, the lane departure warning device 202 determines whether there is a possibility that the host vehicle may veer out of its lane (i.e., lane departure) based on the information indicated by the obtained road information Sj. If the lane departure warning device 202 determines that there is a possibility of lane departure, it notifies the driver. The operation of the lane departure warning device 202 will now be described in more detail with reference to FIG. 7. Incidentally, in the description referring to FIG. 7, the right side refers to the right side in the direction of travel of the host vehicle shown in FIG. 7, and the left side refers to the left side in the direction of travel of the host vehicle shown in FIG. 7.

Figure 7:
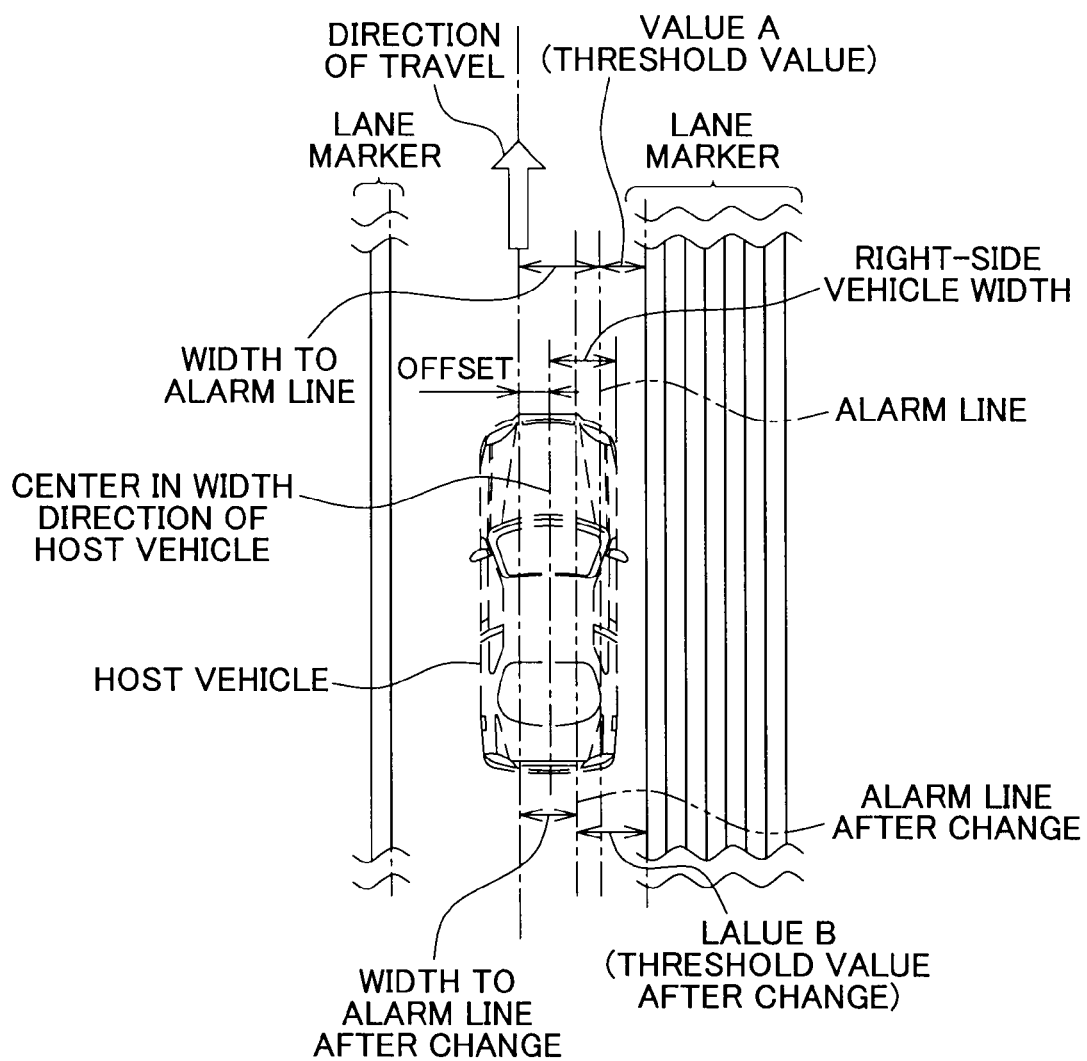
FIG. 7 is a view of an operation of a lane departure warning device.

When the host vehicle is traveling in a position closer to the right lane marker than to the left lane marker and the road information Sj is obtained, the lane departure warning device 202 obtains the right-side lane width, which is from the center of the lane to the right lane marker, by for example obtaining half of the lane width based on the lane width indicated by the obtained road information Sj, as shown in FIG. 7, for example. Once the right-side lane width is obtained, the lane departure warning device 202 obtains the width from the center of the lane to a right alarm line shown in FIG. 7 by calculating the difference of the obtained right-side lane width minus a predetermined value (i.e., a threshold value; value A in the example shown in FIG. 7). In this case, the alarm line is a virtual line at a width from the center of the lane that is calculated by the lane departure warning device 202 in order to determine whether the host vehicle is close to the right lane marker of the lane that the host vehicle is traveling in. When the width from the center of the lane that the host vehicle is traveling in to a greatest width to the right side of the host vehicle is equal to or greater than the width to the alarm line, the host vehicle is close to the right lane marker and the lane departure warning device 202 determines that there is a possibility that the host vehicle will veer off to the right from the lane that the host vehicle is traveling in.

Once the width to the right alarm line is obtained, the lane departure warning device 202 calculates the width from the center of the lane that the vehicle is traveling in to the greatest width to the right side of the host vehicle by adding the offset indicated by the obtained running information Sj to a predetermined right-side vehicle width, which is from the center of the host vehicle to the right edge of the host vehicle. When the width from the center of the lane that the host vehicle is traveling in to the greatest with to the right side of the host vehicle is equal to or greater than the width to the right alarm line, the lane departure warning device 202 determines that there is a possibility that the host vehicle will veer to the right out of the lane that the host vehicle is traveling in, and warns the driver of that possibility.

Incidentally, in the description referring to FIG. 7, a case is described in which the lane departure warning device 202 determines the possibility of the host vehicle veering out of the lane to the right. However, when determining the possibility of the host vehicle veering out of the lane to the left as well, the lane departure warning device 202 similarly obtains the left-side lane width from the center of the lane to the left lane marker based on the lane width indicated by the obtained road information Sj. Once the left lane width is obtained, the lane departure warning device 202 obtains the width from the center of the lane to a left alarm line by calculating the difference of the obtained left-side lane width minus a predetermined value (i.e., a threshold value). Once the width to the left alarm line is obtained, the lane departure warning device 202 calculates the width from the center of the lane that the vehicle is traveling in to the greatest width to the left side of the host vehicle by adding the offset indicated by the obtained running information Sj to a predetermined left-side vehicle width, which is from the center of the host vehicle to the left edge of the host vehicle. When the width from the center of the lane that the host vehicle is traveling in to the greatest with to the left side of the host vehicle is equal to or greater than the width to the left alarm line, the lane departure warning device 202 determines that there is a possibility that the host vehicle will veer to the left out of the lane that the host vehicle is traveling in, and warns the driver of that possibility.

Also, when it is determined that the host vehicle is traveling on the right side of the road, the lane departure warning device 202 determines the possibility of the host vehicle veering off to the right, and when it is determined that the host vehicle is traveling on the left side of the road, the lane departure warning device 202 determines the possibility of the host vehicle veering off to the left. The lane departure warning device 202 may also determine whether the host vehicle is running on the left or right side of the road based on a sign of the offset indicated by the road information Sj or the like.

When the determination information Hj is generated by the change command outputting portion 104, the lane departure warning device 202 obtains the generated determination information Hj. Once the determination information Hj has been obtained, the lane departure warning device 202 increases a predetermined value (value B in the example shown in FIG. 7) for obtaining the width to the alarm line described above. The lane departure warning device 202 changes the width to the alarm line when traveling in a car pool lane by increasing the predetermined value (a threshold value) in this way when the determination information Hj is obtained, so the width to the alarm line can be made narrower than it is when the host vehicle is traveling in a normal running lane, as shown in the example in FIG. 7. As described above, when the host vehicle is traveling in a carpool lane, iris traveling at a relatively higher speed than the speed at which it travels when in a normal running lane. Therefore, even if the steering wheel is turned at the same speed, the direction in which the host vehicle travels will change more than it will when the host vehicle is traveling at a relatively low speed. When the host vehicle is traveling in a carpool lane, the lane departure warning device 202 narrows the width to the alarm line as described above, so when the host vehicle is traveling at a relatively high speed in the carpool lane and is about to veer out of the lane, the operation to notify the driver of that possibility can be performed earlier. As a result, it is possible to prevent a delay in the notification by the lane departure warning device 202 that starts to operate when the host vehicle is about to veer out of its lane.

When the road information Sj has been generated by the measuring device 105, the lane keeping device 203 obtains the generated road information Sj. Once the road information Sj has been obtained, the lane keeping device 203 generates steering torque for steering the steered wheels so that the offset indicated by the obtained road information Sj becomes zero, such that the host vehicle constantly travels in the center in the width direction of the lane. For example, when the lane in which the host vehicle is traveling is a carpool lane, the lane keeping device 203 performs the control described above based on the road information Sj generated based on the innermost lane marker, from among one or more left and right lane markers, as described above.

As described above, with the lane marker recognition apparatus 1 according to this example embodiment, it is possible to advance the timings at which the preventive safety device 201 and the lane departure warning device 202 and the like start to operate by generating determination information Hj when traveling in a carpool lane. Accordingly, it is possible to further increase the safety of occupants in the host vehicle when the host vehicle is traveling in a passing lane such as a carpool lane.

Incidentally, in the carpool lane described above, the lane change point is predetermined, as shown in FIG. 8. As shown in FIG. 8, at the designated point for changing lanes, a plurality of lane markers to the right of the carpool lane merge into a single lane marker so the passing lane determining portion 103 determines that the conditions described above are not satisfied, so the change information Hj is not generated. Therefore, with the lane marker recognition apparatus 1 according to this example embodiment, when the host vehicle changes lanes from a passing lane such as a carpool lane to a normal running lane, the timing at which the preventive safety device 201 and the lane departure warning device 202 and the like start to operate will not be advanced, so the preventive safety device 201 and the lane departure warning device 202 and the like will not start to operate at an earlier timing during a lane change.

Also, in a carpool lane, there are many lane markers to the right of the left lane marker. Therefore, when other conditions, which are described below, in addition to the conditions described above are also satisfied, the passing lane determining portion 103 may also determined that the type of lane that the host vehicle is traveling in is a carpool lane. The other conditions may be, for example, that there be at least one lane marker recognized in the near left region DL and the near right region DR, and that the difference of the number of lane markers in the near right region DR minus the number of lane markers in the near left region DL be two or more. Alternatively, the other conditions may be, for example, that there be at least one lane marker recognized in the far left region UL and the far right region UR, and that the difference of the number of lane markers in the far right region UR minus the number of lane markers in the far left region UL be two or more. Establishing the strict condition that the difference between the number of right lane markers and the number of left lane markers be two or more when determining whether the lane the host vehicle is traveling in is a carpool lane based only on only the near left and right regions or only the far left and right regions in this way makes it possible to prevent an erroneous determination due to noise in the image captured by the camera 101, even when that determination is made based on a small number of regions.

Also, the preventive safety device 201 according to this example embodiment may also be such that, even if the host vehicle is traveling in a carpool lane, the timing at which the preventive safety device 201 starts to operate as described above is not advanced when there is no object able to be detected by radar, i.e., when there are no other cars or pedestrians or the like around the host vehicle.

Also, the preventive safety device 201, the lane departure warning device 202, and the lane keeping device 203 are not limited to the devices that operate in the manner described above. For example, the preventive safety device 201 may be any device which operates to increase the safety of an occupant when it is determined that there is a possibility of a collision between the host vehicle and an object, as long as it is able to advance the timing at which the operation to increase the safety of the occupant starts when the change command Hs is received. Similarly, the lane departure warning device 202 may be any device which operates to notify the driver that there is a possibility that the host vehicle will veer out of its lane when it is determined that that possibility exists, as long as it is able to advance the timing at which the operation to increase the safety of the occupant starts when the change command Hs is received.

Also, the preventive safety device 201 may be a device that adds a function to a system typically referred to as a pre-crash safety system. The added function is that of operating the pre-crash safety system when the change command Hs is received.

Also, the devices in the assist system 2 are devices for increasing the safety of an occupant of the host vehicle and are not limited to the preventive safety device 201, the lane departure warning device 202, and the lane keeping device 203. They may be any kind of devices as long as they are able to advance the timing of starting an operation to increase occupant safety.

Also, the functions of the lane marker recognizing portion 102, the passing lane determining portion 103, the change command outputting portion 104, and the detecting portion 105 may also be realized by predetermined program data which make it possible to execute processing procedures stored in a storage device (such as ROM, RAM, or a hard disk) being interpretively executed by an integrated circuit such as an LSI, CPU, or microcomputer. The integrated circuit may be, for example, an integrated circuit that forms an ECU housed in a movable object such as a vehicle. Also, in this case, the program data may be introduced into the storage device via a storage medium, and may be directly executed from this storage medium. Incidentally, the storage medium may be semiconductor memory such as ROM, RAM, or flash memory, magnetic disc memory such as a flexible disk or a hard disk, optical disk memory such as a CD-ROM, DVD, or BD, or a memory card or the like.

In the above description, a carpool lane is provided to the immediate left in the direction in which a vehicle travels in a normal running lane. However, the example embodiment of the invention may also be applied when a carpool lane is provided to the immediate right in the direction in which a vehicle travels in a normal running lane.

This invention makes it possible to change the timing at which an operation is started according to the lane in which the host vehicle is traveling, and is effective as an onboard apparatus provided in a vehicle that travels in a passing lane or the like, for example.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A lane marker recognition apparatus which recognizes a lane marker based on a captured image of a road surface in the direction in which a vehicle is traveling, comprising:
a lane identifying portion that identifies the type of lane that the vehicle is traveling in based on the image; and
a timing changing portion that provides a change command to change the start timing of an operation of an assist system provided in the vehicle to the assist system when the type of lane identified by the lane identifying portion is a predetermined type of lane,
wherein the lane identifying portion includes
a lane marker counting portion that determines the number of lane markers captured in a predetermined left region in the image and the number of lane markers captured in a predetermined right region in the image, based on the image, and that determines the number of lane markers captured in a predetermined region as a far region in which an area far from the vehicle in the direction in which the vehicle is traveling is captured, and the number of lane markers captured in a predetermined region as a near region in which an area near the vehicle in the direction in which the vehicle is traveling is captured, in each of the left region and the right region, based on the image, and
a carpool identifying portion that identifies whether the type of lane is a carpool lane, based on the number of lane markers captured in the right region and the number of lane markers captured in the left region, in the near region and the far region, and
wherein the timing changing portion provides the change command when the type of lane identified by the lane identifying portion is the carpool lane.

2. The lane marker recognition apparatus according to claim 1, wherein the carpool identifying portion identifies the type of lane as the carpool lane when the number of lane markers captured in the right region counted by the lane marker counting portion is equal to or greater than the number of lane markers captured in the left region.

3. The lane marker recognition apparatus according to claim 1, wherein the carpool lane identifying portion identifies the type of lane as the carpool lane when the number of lane markers captured in the right region is equal to or greater than the number of lane markers captured in the left region in at least one of the near region and the far region.

4. The lane marker recognition apparatus according to claim 3, wherein the carpool lane identifying portion identifies the type of lane as the carpool lane when the number of lane markers in each of the near region and the far region in each of the left region and the right region is determined to be one or more by the lane marker counting portion, the number of lane markers in the near region of the right region is equal to or greater than the number of lane markers in the near region of the left region, and the number of lane markers in the far region of the right region is equal to or greater than the number of lane markers in the near region of the left region.

5. The lane marker recognition apparatus according to claim 3, wherein the carpool lane identifying portion identifies the type of lane as the carpool lane when the number of lane markers in the near region of each of the left region and the right region is determined to be one or more by the lane marker counting portion, and a difference obtained by subtracting the number of lane markers in the near region of the left region from the number of lane markers in the near region of the right region is two or more.

6. The lane marker recognition apparatus according to claim 3, wherein the carpool lane identifying portion identifies the type of lane as the carpool lane when the number of lane markers in the far region of each of the left region and the right region is determined to be one or more by the lane marker counting portion, and a difference obtained by subtracting the number of lane markers in the far region of the left region from the number of lane markers in the far region of the right region is two or more.

7. The lane marker recognition apparatus according to claim 1, wherein the timing changing portion provides the change command to a preventive safety device provided in the vehicle as the assist system.

8. The lane marker recognition apparatus according to claim 1, wherein the timing changing portion provides the change command to a lane departure warning device provided in the vehicle as the assist system.

9. The lane marker recognition apparatus according to claim 1, wherein the timing changing portion provides the change command to advance the start timing to the assist system.

10. A preventive safety system that includes the lane marker recognition apparatus according to claim 1, and a preventative safety device that increases safety when the vehicle collides with an object, wherein the preventative safety device comprises:
  an obtaining portion the obtains the change command;
  a detecting portion that detects the relative distance and relative speed between the vehicle and the object;
  a calculating portion that calculates the time to collision between the vehicle and the object based on the relative distance and relative speed between the vehicle and the object detected by the detecting portion;
  an operating portion that starts an operation to increase safety when the time calculated by the calculating portion is equal to or less than a predetermined threshold value; and
  a resetting portion that resets the threshold value to a larger value when the obtaining portion obtains the change command.

11. The preventive safety system according to claim 10, wherein the operating portion starts an operation to issue a warning to a driver of the vehicle when the time calculated by the calculating portion is equal to or less than the threshold value that has been reset by the resetting portion.

12. The preventive safety system according to claim 11, wherein the operating portion starts to operate a brake of the vehicle when the time calculated by the calculating portion is equal to or less than the threshold value that has been reset by the resetting portion.

13. The preventive safety system according to claim 11, wherein the operating portion starts an operation to retract a seatbelt worn by an occupant of the vehicle when the time calculated by the calculating portion is equal to or less than the threshold value that has been reset by the resetting portion.

14. A lane departure warning system that includes the lane marker recognition apparatus according to claim 1, and a lane departure warning device that warns that there is a possibility that the vehicle will veer out of a lane that the vehicle is traveling in, when the lane departure warning device determines that there is the possibility that the vehicle will veer out of the lane, wherein the lane departure warning device comprises:
  a second obtaining portion that obtains road information indicative of the lane width of the lane that the vehicle is traveling in, which is detected based on the image, and the offset from the center of the lane to the center in the width direction of the vehicle, which is detected based on the image;
  a first calculating portion that calculates the width from the center of the lane that the vehicle is traveling in to one of a left or right lane marker based on the lane width indicated by the road information;
  a second calculating portion that calculates the difference of the width calculated by the first calculating portion minus a predetermined threshold value;
  a third calculating portion that calculates the sum of the offset indicated by the road information and the width from the center in the width direction of the vehicle to one of the left or right side of the vehicle;
  an operating portion that starts an operation to issue an alarm to a driver of the vehicle when the sum calculated by the third calculating portion becomes equal to or greater than the difference calculated by the second calculating portion; and
  a resetting portion that resets the threshold value to a larger value when the command receiving portion receives the change command.

15. A lane marker recognition method executed by a lane marker recognition apparatus which recognizes a lane marker based on a captured image of in the direction in which a vehicle is traveling, comprising:
  identifying the type of lane that the vehicle is traveling in based on the image; and
  providing a change command to change the start timing of an operation of an assist system provided in the vehicle to the assist system based on the type of lane identified,
  wherein the lane identifying includes
    determining the number of lane markers captured in a predetermined left region in the image and the number of lane markers captured in a predetermined right region in the image, based on the image, and that determines the number of lane markers captured in a predetermined region as a far region in which an area far from the vehicle in the direction in which the vehicle is traveling is captured, and the number of lane markers captured in a predetermined region as a near region in which an area near the vehicle the direction in which the vehicle is traveling is captured, in each of the left region and the right region, based on the image; and
    identifying whether the type of lane is a carpool lane, based on the number of lane markers captured in the right region and the number of lane markers capture in the left region, in the near region and the far region, and
  wherein the change command is provided when the type of lane is the carpool lane.

16. A lane keeping system that includes the lane marker recognition apparatus according to claim 1, and a lane keeping device that performs control so that the vehicle constantly travels along the center in the width direction of a lane, wherein the lane keeping device comprises:
  a second obtaining portion that obtains road information indicative of the lane width of the lane that the vehicle is raveling in, which is detected based on the image, and the offset from the center of the lane to the center in the width direction of the vehicle, which is detected based on the image; and
  a steering portion that performs control so that the vehicle constantly travels along the center in the width direction of the lane that the vehicle is traveling in, by generating steering torque that steers steered wheels of the vehicle so that the offset becomes zero, when the road information has been obtained.

* * * * *